(12) United States Patent
Vandendorpe et al.

(10) Patent No.: US 6,400,781 B1
(45) Date of Patent: Jun. 4, 2002

(54) MULTIBAND DETECTOR

(75) Inventors: Luc Andre Marie Vandendorpe, Louvain-la-Neuve; Olivier van de Wiel, Brussels, both of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/178,821

(22) Filed: Oct. 26, 1998

(30) Foreign Application Priority Data

Oct. 27, 1997 (EP) ............................................. 97402544

(51) Int. Cl.[7] ................................................ H04B 1/10
(52) U.S. Cl. ...................................................... 375/350
(58) Field of Search ................................. 375/350, 260, 375/285, 296; 370/480, 484, 329, 468; 708/300

(56) References Cited

U.S. PATENT DOCUMENTS

| | | | | |
|---|---|---|---|---|
| 5,751,716 A | * | 5/1998 | Tzannes et al. | 370/468 |
| 5,832,030 A | * | 11/1998 | Tzannes et al. | 375/260 |
| 6,169,723 B1 | * | 1/2001 | Fertner et al. | 370/210 |

FOREIGN PATENT DOCUMENTS

WO  9505711  2/1995

OTHER PUBLICATIONS

"Transmultiplexers: Perfect Reconstruction and Compensation of Channel Distortion" by Ramachandran et al. Signal Processing, European Journal Vo. 21, No. 3, 11/90, pp. 261–274.

"Adaptive Sub–Channel Equalization in Multicarrier Transmission", by Qin et al, 1997 IEEE pp. 2321–2324.

"How to combat long echoes in OFDM transmission schemes: Sub–channel equalization or more powerful channel coding" by Viterbo et al, 1995 IEEE, pp. 2069–2072.

"Performance of Fractionally spaced Linear and Decision–Feedback Equalizers for Multitone Systems" Vandendorpe. 1996 IEEE, pp. 36–40.

"Analysis and Design of Periodically Time–Varying IIR Filters with Applications to Transmultiplexing" by Prater et al. 1992 IEEE, pp. 2715–2725.

"Subband Model and Implementation of O–QAM System" by Xhang et al, 1995 IEEE International Symposium on Circuits and Systems, May 1995, pp. 1888–1891.

"Adaptive Equalization Structures for Multitone CDMA Systems" van de Wiel et al, 5th IEEE Int'l Symposium on Communications, Sep. 1994, pp. 253–257.

"A Multicarrier E1–HDSL Transciever System with Coded Modulation" by Chow et al, Vo. 4, No. 3 May–Jun. 1993 Journal of European Transactions, pp. 257–266.

Overlapped Discrete Multitone Modulation for High Speed Copper Wire Communications, by Sandberg et al, 1995 IEEE, Journal in Communications, pp. 1571–1585.

"Multicarrier Modulation for Data Transmission: An Idea Whose Time Has Come" by Bingham, 1990 IEEE Communications Magazine, pp. 5–14.

* cited by examiner

*Primary Examiner*—Chi Pham
*Assistant Examiner*—Khai Tran
(74) *Attorney, Agent, or Firm*—Ware, Fressola, Van Der Sluys & Adolphson LLP

(57) ABSTRACT

In a multiband detector (DET), sub-band reconstruction and distortion compensation is performed by a plurality of digital filters (FIR1, . . . , FIRk, . . . , FIRN) arranged in a single-input-multiple-output architecture. Each digital filter (FIRk) is coupled between one and the same input (RDA-I) whereto a distorted multiband signal (si) is applied and a respective output (RDA-Ok) whereto a reconstructed sub-band signal (sik) is applied. This multiband detector (DET) has a uniform architecture for each input-output path and can easily be adapted to changes in distortion of the multiband signal (si), even if these changes only affect a few sub-bands.

7 Claims, 6 Drawing Sheets

MULTIBAND DETECTOR

TECHNICAL FIELD

The present invention relates to a multiband detector used to generate a plurality of sub-band symbols from a distored multiband signal applied to a detector input thereof.

BACKGROUND OF THE INVENTION

Such a multiband detector is already known in the art, e.g. from the article 'A Multicorrier E1-HDSL Transceiver System with Coded Modulation' from the authors Peter S. Chow, Noofal Al-Dhchir, John M. Cioffi and John A. C. Bingham. This article was published in the issue N° 3, May/June 1993 of the Journal of European Transactions on Telecommunications and Related Technologies (ETT), pages 257–266.

Therein, the multiband detector, named DMT (Discrete Multi Tone) receiver and drawn in FIG. 5 of that article, contains an arrangement which reconstructs the individual carrier signals of an incoming multicarrier signal and which compensates for distortion of the incoming multicarrier signal due to transmission over a transmission line in between a DMT transmitter drawn in FIG. 4 of that article and the DMT receiver drawn in FIG. 5 of that article. This arrangement consists of the cascade connection of a time domain equalizer, a serial to parallel converter with cyclic prefix stripper, a fast fourier transformer and a frequency domain equalizer. The time domain equalizer is a short adaptive finite impulse response filter which aims to reduce the cyclic prefix of multicarrier symbols by shortening the impulse response length of the transmission line. The time domain equalizer so helps to reduce intersymbol interference with an acceptable cyclic prefix length. Samples of a single multicarrier symbol in the incoming multicarrier signal are then paralleled by the serial to parallel converter and applied to the fast fourier transformer to be transformed from time domain to frequency domain. Since the equalized channel, i.e. the combination of transmission line and time domain equalizer, is not yet flattened, a frequency domain equalizer is included in the arrangement to compensate for phase and amplitude distortions of individual carriers. The frequency domain equalizer thereto consists of a parallel structure of one-tap filters, adaptive via a least mean square technique. The arrangement of time domain equalizer, serial to parallel converter, fast fourier transformer and frequency domain equalizer is followed by what is called a decoder in the cited article but is named a decision unit in this document. This decoder or decision unit compares the single carrier signals at the outputs of the frequency domain equalizer with the constellation schemes used to modulate the respective carriers and derives therefrom the symbols modulated on the different carriers.

An arrangement which compensates for distortion in a discrete wavelet multitone signal, i.e. another kind of multiband signal, and which reconstructs the different wavelet bands from the distorted wavelet multitone signal is known from the article 'Overlapped Discrete Multitone Modulation for High Speed Copper Wire Communications' from the authors Stuart D. Sandberg and Michael A. Tzonnes. This article was published in the IEEE Journal on selected Areas in Communications, Vol. 13, N° 9 of December 1995, and the arrangement described therein and drawn partially in FIG. 1 has an architecture similar to the above described one. A pre-detection equalizer suppresses intersymbol interference by digitally filtering the incoming discrete wavelet multitone signal, a wavelet transformer generates the wavelet sub-band signals and applies these wavelet sub-band signals in parallel to a post-detection equalizer which again consists of a parallel structure of single band equalizers adapted via a least mean square technique. The arrangement, except for the length in taps of the pre-detection equalizer and post-detection equalizer and the nature of the transformation used to reconstruct the sub-bands from the multiband signal, does not differ significantly from the above described arrangement with time domain equalizer, fast fourier transformer and frequency domain equalizer. The arrangement in the article from Stuart D. Sandberg and Michael A. Tzonnes further is coupled to a so called constellation symbol decision unit comparable to the decoder in the article from Peter S. Chow et al.

In a more general article 'Multicarrier Modulation for Data Transmission: An Idea Whose Time Has Come', the author John A. C. Bingham proposes a structure with a simple equalizer which performs a time domain convolution, a transformer which reconstructs orthogonal sub-bands from a multiband signal, and a set of parallel single band equalizers. The article from John A. C. Bingham was published in IEEE Communications magazine of May 1990 and obviously suggests to use, whatever the nature of the multiband to sub-band transformation, a detector with an architecture similarly to that of the above cited articles.

The architecture of a detector for sub-band reconstruction and distortion compensation, known from the above reference articles, has the disadvantage that it is insufficiently flexible vis a vis changes in the distortion of the multiband signal on the transmission line. Narrowband distortions for instance, which affect only a few sub-bands and which are likely to occur as can be derived from the articles of John A. C. Bingham (see page 12, paragraph entitled "Single-Frequency Interference") and Peter S. Chow et al (see page 259; right-hand column, lines 28–29), can be compensated for by adapting the taps of the pre-detection equalizer or by enlarging the number of taps in the pre-detection equalizer but these solutions obviously have an influence on the detection of other sub-bands which are not affected by the norrowband distortions. This solution consequently is not very effective which explains why Peter S. Chow and John A. C. Bingham propose to either update the bit allocations or to avoid using affected carriers in their respective articles in response to narrowband distortions.

The known architecture moreover limits the applicability of the multiband detector to environments wherein one and the some kind of multiband signal is transferred. By the choice of the sub-band reconstructor in between the pre-detection equalizer and the post-detection equalizer, the multiband detector becomes able to either receive DMT (Discrete Multi Tone) signals whose sub-bands are reconstructed via a fast fourier transformation, DWMT (Discrete Wavelet Multi Tone) signals whose sub-bands are reconstructed via a wavelet transformation, or another kind of multiband signal whose orthogonal sub-bands are reconstructed via yet another transformation. Receiving another kind of multiband signal with a detector having the known architecture requires replacement of components therein. For evident reasons (complexity of interfacing) this is not done.

SUMMARY OF THE INVENTION

An object of the present invention is to provide a multiband detector of the above known type, but which is more flexibly adaptive to distortion changes on the transmission line, even if these changes in distortion affect only a few sub-bands, and which is suitable for detection of different kinds of multiband signals.

This object is realised by a multiband detector used to generate a plurality of sub-band symbols from a distorted multiband signal applied to a detector input thereof, the multiband detector comprising the cascade connection of: a sub-band reconstruction and distortion compensation arrangement whose arrangement input is coupled to the detector input and which is adapted to compensate for distortion in the distorted multiband signal and to reconstruct a plurality of sub-band signals from the distorted multiband signal, and to source each sub-band signal amongst the plurality of sub-band signals via a respective arrangement output amongst a plurality of arrangement outputs; and a decision unit with a plurality of unit inputs coupled one by one to the plurality of arrangement outputs and a plurality of associated unit outputs, the decision unit including between each unit input and associated unit output a comparator means adapted to compare the sub-band signal with a constellation scheme and to thereupon decide upon the value of a sub-band symbol amongst the plurality of sub-band symbols, wherein the sub-band reconstruction and distortion compensation arrangement contains between the arrangement input and each arrangement output, a single digital filter whose taps are set to perform sub-band reconstruction and distortion compensation simultaneously and to thereby generate a said sub-band signal.

Indeed, according to the present invention, the multiband detector is given a more homogeneous architecture over the different sub-bands. The different input-output paths of the detector, which each reconstruct one sub-band signal out of the incoming multiband signal, are very similar and can be tuned separately. By adapting the taps of one digital filter or increasing/decreasing the number of taps of one digital filter, the corresponding sub-band is made less or more distortion resistant independently from the other sub-bands.

Furthermore, by adapting the taps of all digital filters, the detector according to the present invention can be enabled to receive multiband signals of different nature. This is so because the taps of each digital filter contain two contributions. A first contribution depends on the set of orthogonal base functions used to constitute the multiband signal and allows reconstruction of the sub-bands. The second contribution depends on the transmission line characteristics and allows to compensate for distortion due to transmission of the multiband signal over the transmission line. If the first contribution is modified to accord with a new set of base functions, the detector is able to receive for instance DWMT signals instead of DMT signals. Such a modification of the taps is realisable according to the present invention. The detector according to the present invention hence may be used to manufacture a multi-mode multiband receiver which, when switched from one mode to another, is able to receive another kind of multiband signal.

It has to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it has to be noted that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional feature of the present multiband detector is such a detector that further comprises a control unit adapted to modify the taps of the digital filter upon changes in distortion of the distorted multiband signal.

Indeed, although changes in the distortion on the transmission line may be compensated for by updating the allocation of bits to different sub-bands, or may be updated by a technician which resets the tap values of the digital filters based on signal-to-noise ratio measurements on the transmission line, it is advantageous to incorporate a control unit which automatically adapts the filter taps when changes in the distortion on the transmission line are detected. The transmission line thereto may be monitored continuously or at discrete time intervals.

Another feature of the multiband detector according to the present invention is such a detector with a control unit that is adapted to modify the amount of the taps of the digital filter.

In this way, the control unit is not only capable of adapting the tap values but also of modifying the number of taps in a digital filter rendering a higher degree of flexibility to react to channel changes.

A further advantageous feature of the multiband detector according to the present invention, is such a detector where the comparator means is coupled to at least one tapped delay line adapted to feed back a linear combination of subsequent sub-band symbols at the corresponding unit output to another unit input than the unit input to be added there to a sub-band signal received from the sub-band reconstruction and distortion compensation arrangement.

In this way, intercarrier interference and intersymbol interference can be reduced in a less processing intensive manner than it is compensated for by the sub-band reconstruction and distortion compensation arrangement. This is so because the decision unit operates at the multiband symbol clock speed whereas the sub-band reconstruction and distortion compensation arrangement operates at the sample clock speed. Modification of a tap of a digital filter allows access to a greater frequency bandwidth than modification of a coefficient in a tapped delay line since the tops in the digital filters have a higher time resolution than the coefficients in the tapped delay lines. Hence, there is a trade-off between accuracy and mathematical complexity which determines the length of the tapped delay lines in the decision unit and of the digital filters in the sub-band reconstruction and distortion compensation arrangement.

Yet another advantageous feature of the multiband detector according to the present invention is where the control unit further is adapted to modify coefficients in the linear combination.

A similar reasoning to the one set out above for claim 2 in relation with adaptation of the taps of the digital filters leads to the conclusion that it is advantageous to have the control unit automatically updating the coefficients in the tapped delay lines of the decision unit when changes in the distortion on the transmission line are detected.

Furthermore, a feature of the present invention is where the detector has a sample clock of the multiband detector which has a higher sample clock speed than a sample clock of a multiband generator which generated the multiband signal.

In this way, the available bandwidth for sub-band reconstruction is increased significantly which has an improving effect on the sub-band reconstruction process, especially if the base functions of the multiband signal have a lot of their energy dispersed in sidelobes. The more energy is located at high frequencies and the flatter the channel attenuation, the more useful it is to sample the received multiband signal pie rate.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
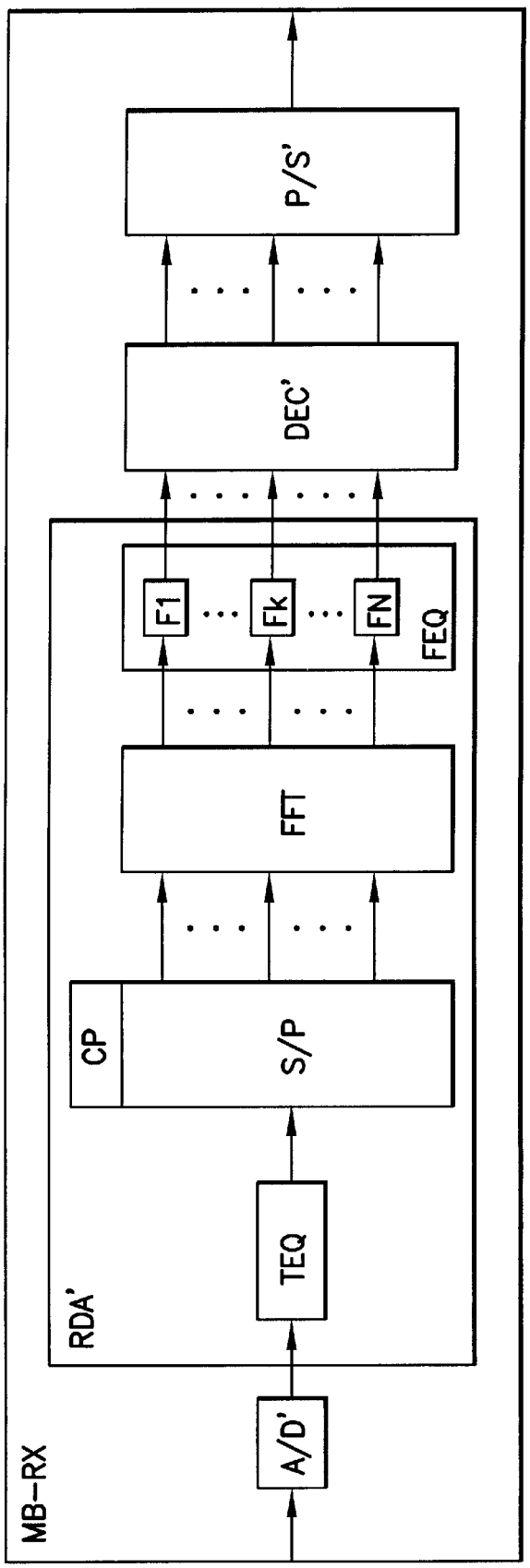
FIG. 1 is a block scheme of a known multiband receiver MB-RX.

FIG. 1 shows the architecture of a traditional multiband receiver MB-RX used to receive DMT (Discrete Multi Tone) signals for instance in an ADSL (Asynchronous Digital Subscriber Line) system. Such a DMT signal consists of a sequence of DMT symbols which have an equal length in time. Each DMT symbol is the superposition of a set of modulated carriers. To be able to receive the DMT signals, the multiband receiver MB-RX comprises the cascade connection of an analogue to digital converter A/D', a time domain equalizer TEQ, a serial to parallel converter S/P with cyclic prefix remover CP, a fast fourier transformer FFT, a frequency domain equalizer FEQ, a decision unit DEC' and a parallel to serial converter P/S'. The time domain equalizer TEQ, serial to parallel converter S/P with cyclic prefix remover CP, the fast fourier transformer FFT and the frequency domain equalizer FEQ constitute an arrangement for sub-band reconstruction and distortion compensation RDA'. The frequency domain equalizer FEQ includes between each input/output pair a filter F1, . . . , Fk, . . . , FN.

An incoming DMT (Discrete Multi Tone) signal is sampled by the analogue to digital converter A/D' at the sample clock rate. The digitised multiband signal is then applied to the time domain equalizer TEQ which is a digital filter whose taps are adapted (e.g. iteratively) in such a way that the length of the equalized impulse response, i.e. the impulse response of the cascade of the transmission line and time domain equalizer, is reduced to a certain extent. Subsequent samples of the equalized DMT signal which constitute one DMT symbol are paralleled by the serial to parallel converter S/P, and the cyclic prefix remover CP removes the cyclic prefix which is added to each DMT symbol to reduce intersymbol interference. If the equalized channel impulse response length is shorter than the cyclic prefix added to each DMT symbol, the time domain equalizer TEQ and cyclic prefix remover CP eliminate intersymbol interference perfectly. Usually, this is not achieved completely. After cyclic prefix removal, the N remaining samples of the DMT symbol are converted from time domain to frequency domain by the fast fourier transformer FFT. The signal at each output of the fast fourier transformer FFT represents a single sub-carrier of the multiband signal and may be seen as a complex value whose magnitude and phase correspond to the magnitude and phase of the modulated sub-carrier represented thereby. To compensate for the frequency dependent attenuation and phase distortion of the transmission line, the frequency domain equalizer FEQ adjusts each sub-carrier at the output of the fast fourier transformer FFT by multiplying it with a single complex value. The frequency domain equalizer FEQ thereto is provided with N one-top complex least mean square adaptive filters F1, Fk, . . . , FN. The decision unit DEC' has knowledge of the amount of bits modulated on each carrier and of the modulation technique used thereto. By comparison of the sub-carriers with the constellation schemes used to modulate these sub-carriers, the decision unit DEC' can determine the symbols modulated on each carrier. When these symbols are serialised by the parallel to serial converter P/S', an outgoing datastream representing the demodulated data is constituted.

As already indicated in the introductory part of this application, the prior art multiband receiver MB-RX has an architecture which does not allow it to receive other kinds of multiband signals than DMT signals without replacement of at least one component, the fast fourier transformer FFT, by another filter bank whose transformation is based on another set of orthogonal base functions. Moreover, changes in the distortion on the transmission line towards the multiband receiver MB-RX always require adaptation of the taps of the time domain equalizer TEQ which implies that reception of all sub-bonds is modified even if the changes in distortion only affect a few sub-bands.

Figure 2:
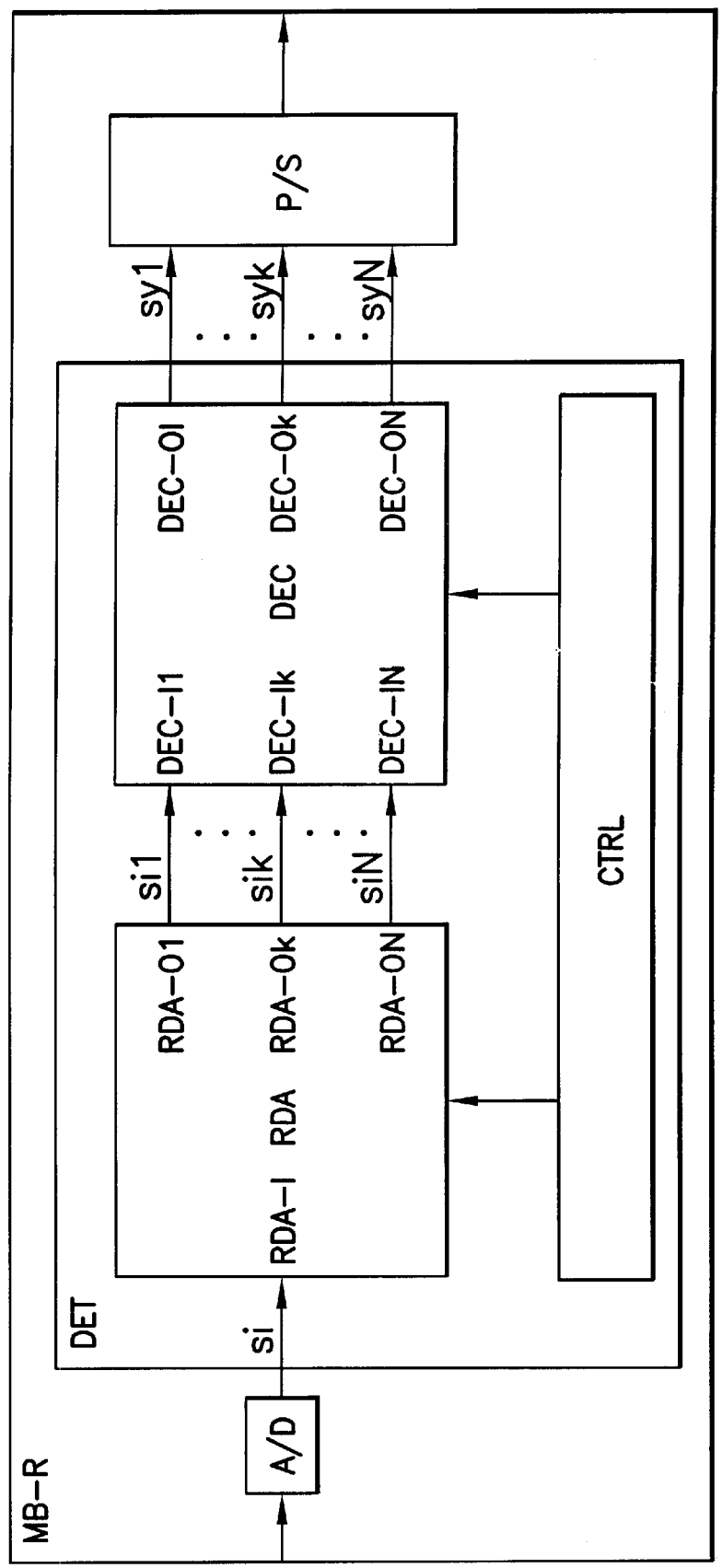
FIG. 2 is a block scheme of an embodiment of the multiband receiver MB-R according to the present invention.

The multiband receiver MB-R drawn in FIG. 2 includes an analogue to digital converter A/D, a multiband detector DET and a parallel to serial converter P/S. The multiband detector DET comprises a sub-band reconstruction and distortion compensation arrangement RDA, a decision unit DEC and a control unit CTRL.

The analogue to digital converter A/D is coupled between the input terminal of the multiband detector MB-R and an input RDA-I of the sub-band reconstruction and distortion compensation arrangement RDA. N outputs RDA-O1, . . . , RDA-Ok, . . . RDA-ON of the sub-band reconstruction and distortion compensation arrangement RDA are connected one by one to N inputs DEC-I1, . . . , DEC-1k, . . . DEC-IN of the decision unit DEC. N outputs DEC-O1, . . . , DEC-Ok, . . . , DEC-ON of the decision unit DEC are connected to inputs of the parallel to serial converter P/S which further has an output coupled to the output terminal of the multiband receiver MB-R. The control unit CTRL has output ports coupled to control ports of both the sub-band reconstruction and distortion compensation arrangement RDA and the decision unit DEC. Before describing the working of the different components of the multiband receiver MB-R, the internal structure of the arrangement RDA and decision unit DEC is given by reference to FIG. 3 and FIG. 4.

Figure 3:
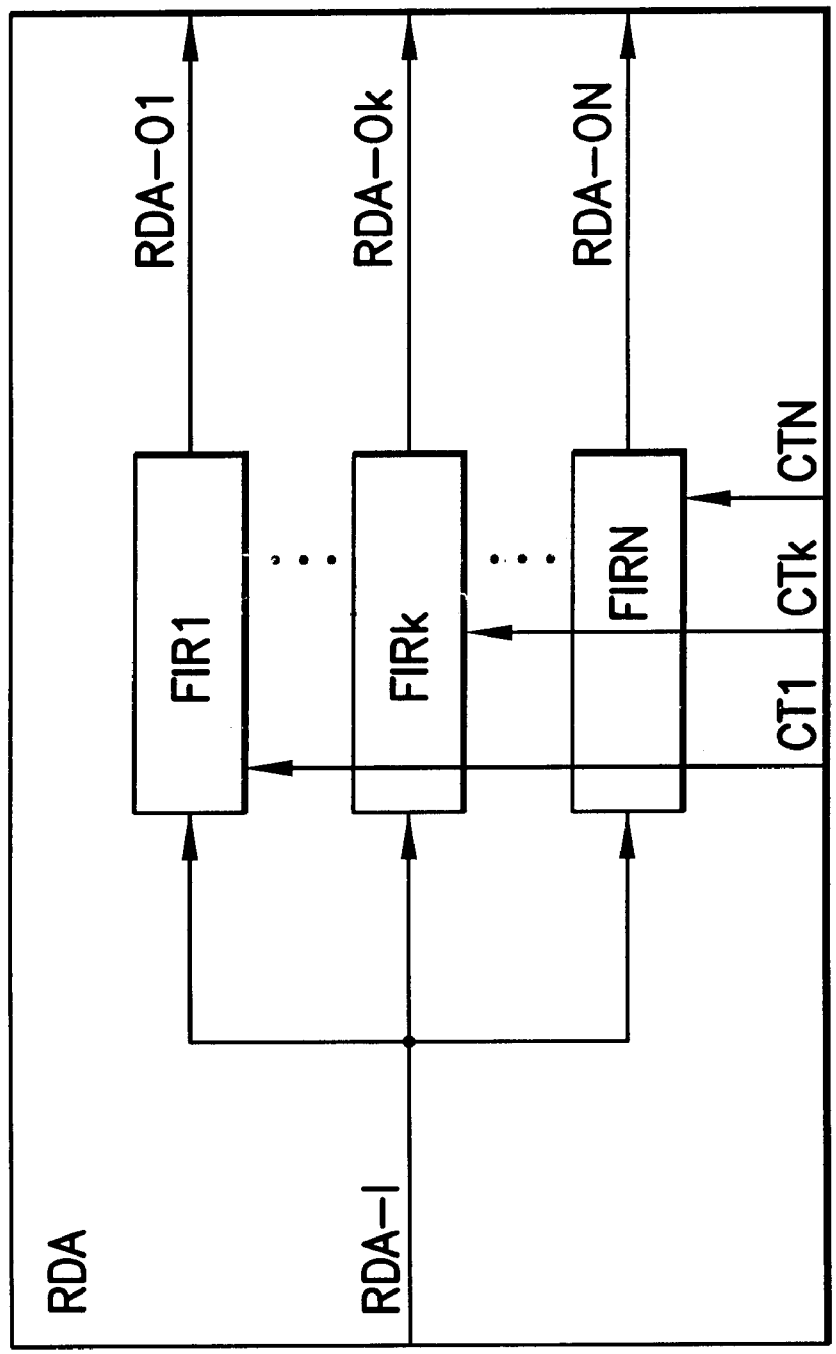
FIG. 3 is a block scheme of the sub-band reconstruction and distortion compensation arrangement RDA in the multiband receiver MB-R of FIG. 2.

The sub-band reconstruction and distortion compensation arrangement RDA of FIG. 2 is drawn in more detail in FIG. 3. This arrangement RDA comprises N digital finite impulse response filters FIR1, ..., FIRk, ..., FIRN, coupled between the arrangement input RDA-I and respective arrangement outputs RDA-O1, ..., RDA-Ok, ..., RDA-ON. The sub-band reconstruction and distortion compensation arrangement RDA thus has a single-input-multiple-output architecture with separate paths between the input RDA-I and each output RDA-O1, ..., RDA-Ok, ..., RDA-ON. Each path is constituted by a single digital filter FIR1, ..., FIRk, ..., FIRN and each of these filters FIR1, ..., FIRk, ..., FIRN further is equipped with a control input CT1, ..., CTk, ..., CTN.

Figure 4:
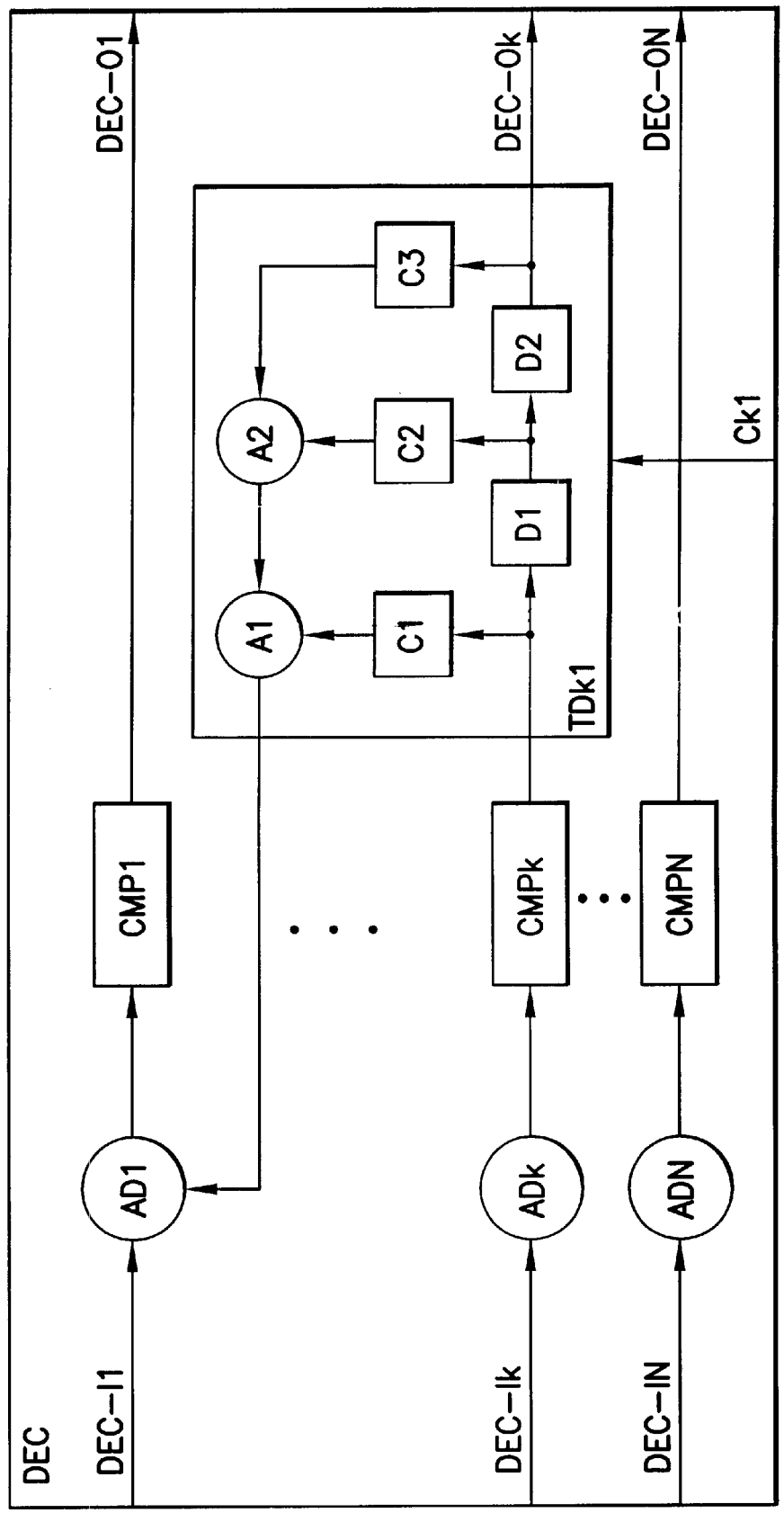
FIG. 4 is a block scheme of the decision unit DEC in the multiband receiver MB-R of FIG. 2.

The decision unit DEC of FIG. 2 is drawn in more detail in FIG. 4, and contains N comparator means CMP1, ..., CMPk, ..., CMPN and a number of topped delay lines only one of which TDk1 is drawn. Between an input DEC-Ik and a corresponding output DEC-Ok, the decision unit DEC contains an adder ADk, a comparator CMPk and one or more tapped delay lines TDk1. The topped delay lines TDk1 have an output coupled to the adder AD1 of another input-output path of the decision unit DEC. The only topped delay line TDk1 drawn in FIG. 4 forms part of the path between the k'th input DEC-Ik and k'th output DEC-Ok of the decision unit DEC, and has an output coupled to the adder AD1 in the path between the first input DEC-I1 and first output DEC-O1 of the decision unit DEC. This tapped delay line TDk1 consists of two delay units, D1, and D2, coupled in cascade between the output of comparator means CMPk and the k'th output DEC-Ok of the decision unit DEC, three multipliers, C1, C2 and C3, and two adders, A1 and A2. The multipliers C1, C2 and C3 are connected with their inputs to outputs of the comparator means CMPk, the first delay unit D1 and the second delay unit D2 respectively. Outputs of the second and third multiplier, C2 and C3, are connected to inputs of the second adder A2, and this second adder A2 and the first multiplier C1 have outputs which serve as inputs for the first adder A1. An output of the first adder A1 is connected to an input of the adder AD1 at the first input DEC-I1 of the decision unit DEC. The tapped delay line TDk1 is further equipped with a control input Ck1. Of the path between the first input terminal DEC-I1 and first output terminal DEC-O1 only the adder AD1 and comparator means CMP1 are drawn. Nevertheless, this path may also contain one or more tapped delay lines with a structure similar to that of TDk1. Similarly, to avoid overloading the figure FIG. 4, only the adder ADN and comparator means CMPN of the path between the N'th input terminal DEC-IN and N'th output terminal DEC-ON are drawn, although this path also may include one or more tapped delay lines.

An incoming analogue multiband signal is sampled by the analogue to digital converter A/D at the entrance of the multiband receiver MB-R drawn in FIG. 2. The analogue to digital converter A/D thereto is controlled by a sample clock, not drawn in the figure, which may be synchronised with a sample clock in the multiband transmitter that communicates with the multiband receiver MB-R or which may be fractionally spaced compared to the sample clock in the multiband transmitter, as will be explained later on. The analogue to digital converter A/D in this way generates a digitised multiband signal si and applies this multiband signal to the input RDA-I of the sub-band reconstruction and distortion compensation arrangement RDA. In this arrangement RDA, the same multiband signal si is applied to each digital filter FIR1, ..., FIRk, ..., FIRN but each digital filter FIR1, ..., FIRk, ..., FIRN reconstructs another sub-band signal si1, ..., sik, ..., siN respectively and sources this sub-band signal si1, ..., sik, ..., siN via another output terminal RDA-O1, ..., RDA-Ok, ..., RDA-ON of the arrangement RDA. That a single digital finite impulse response filter FIRk can reconstruct a sub-band signal sik from the multiband signal si and simultaneously can compensate for channel distortion of this sub-band signal (minimizing intersymbol interference, intercarrier interference) and can filter noise such as NEXT (Near End Crosstalk), FEXT (Far End Crosstalk), radio frequency interference or even other disturbances, is based on the insight that the operations of the time domain equalizer TEQ, fast fourier transformer FFT and frequency domain equalizer FEQ are comparable digital signal processing operations that can be integrated in one digital filter FIRk. To determine the values of the taps of the digital filters FIR1, ..., FIRk, ..., FIRN, different techniques may be used. When the taps are initialised with predetermined initialisation values, and the transmitter sends a predetermined training multiband signal to the multiband receiver MB-R, the output of the sub-band reconstruction and distortion compensation arrangement RDA can be compared with the expected output. A simple matrix inversion allows to calculate the values of the taps which would make the sub-band reconstruction and distortion compensation arrangement RDA produce the expected sub-band signals. These values are installed and the multiband receiver MB-R is capable of receiving any unknown multiband signal to produce therefrom the component sub-band signals. The matrix inversion and installation of the tap values is a task for the control unit CTRL drawn in FIG. 2 which can adopt the tap values of the digital filters FIR1, ..., FIRk, ..., FIRN via respective control ports CT1, ..., CTk, ..., CTN of the arrangement RDA drawn in FIG. 3. Alternatively, the multiband transmitter that communicates with the multiband receiver MB-R may transmit a non-predetermined training multiband signal. A periodical signal or a pseudo-noise signal for instance also allows the multiband receiver MB-R to measure the channel and to calculate the optimal filter tap values via matrix inversion. Yet another alternative way to obtain the filter top values is a solution wherein again a predetermined training multiband signal is transmitted to the multiband receiver MB-R which now contains hardware in the control unit CTRL to adapt the taps of the digital filters FIR1, ..., FIRk, ..., FIRN step by step. The latter alternative however may suffer from long convergence times depending on the channel and transmitter filter bank characteristics.

Figure 5:
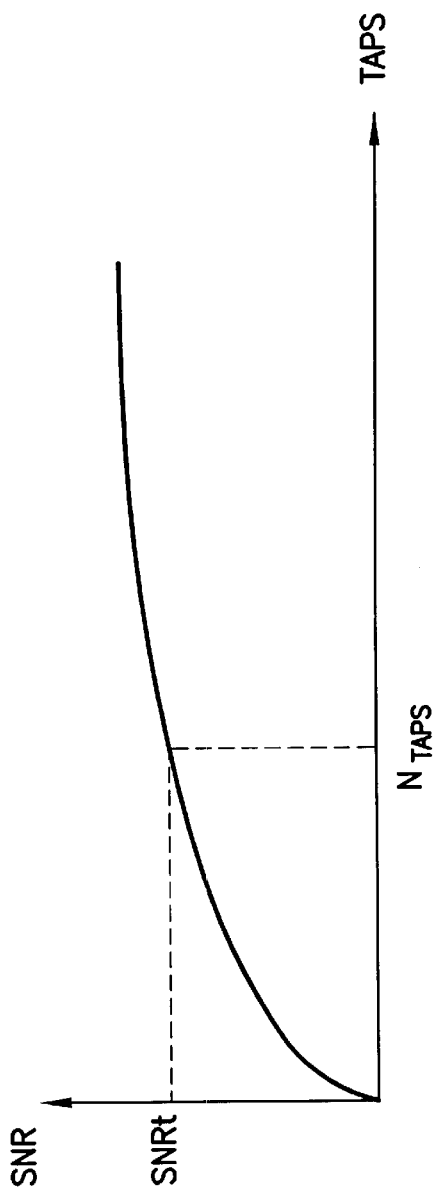
FIG. 5 is a graph illustrating the relation between the signal to noise ratio SNR after distortion compensation and the number of taps TAPS in the digital filters of the sub-band reconstruction and distortion compensation arrangement RDA.

FIG. 5 shows a typical evolution of the signal to noise ratio SNR of a sub-band as a function of the number of taps TAPS in the digital filter which reconstructs that sub-band, and provides a criterion for selecting the number of taps $N_{TAPS}$ in a particular filter FIRk. Indeed, to be able to modulate a certain amount of bits bi on a sub-band and to be able to transfer this sub-band with this amount of bits bi over the transmission line so that these bits can be recovered, a minimum target signal to noise ratio SNR, has to be achieved for his sub-band. Knowledge of the curve drawn in FIG. 5 then enables one to determine the number of taps $N_{TAPS}$ to be provided in each digital filter FIRk.

Besides calculating the initial settings for the taps of the digital filters FIR1, ..., FIRk, ..., FIRN, the control unit CTRL has the task to adapt the tap values when changes in the distortion of one or more sub-bond occur. The taps of a single sub-band may be adapted when this sub-band suddenly becomes more affected by noise, e.g. because of transmission of a radio amateur at a frequency in the vicinity of the sub-band, or when changes in the channel justify this. The taps of a single sub-band may be increased in number when this sub-band suddenly becomes more disturbed. The taps of all filters may be adapted when the transmission quality over the transmission line decreases significantly over a large number of sub-bands. To adapt the taps of the filters several techniques, well-known in the art since they are also used to adapt for instance the time domain equalizer settings and frequency domain equalizer settings in the prior art multiband receiver MB-RX, can be used. First order techniques such as normalised LMS (Least Mean Square) adaptation, or block LMS (Least Mean Square) adaptation can be implemented in software or hardware. Whereas the hardware implementation has the drawback that it requires a higher complexity, the software implementation has the disadvantage of being slower. In a fast changing channel, the hardware implementation may be preferred. For a slow varying channel such as a twisted pair telephone line, adaptivity at sample clock speed is not required so that the mathematical complexity can justify a software implementation. It is to be noted that instead of a first order adaptation technique, more complex higher order adaptation techniques such as the RLS (Recursive Least Square) adaptation can be used too.

The sub-band signals si1, ..., sik, ..., siN at the outputs RDA-O1, ..., RDA-Ok, ..., RDA-ON are applied to the decision unit DEC which in its simplest implementation consists of some comparator means which compare each sub-band signal sik with the constellation scheme that is used by the multiband transmitter for modulating that sub-band signal sik. From this comparison, the decision unit DEC then determines the symbols sy1, ..., syk, ..., syN modulated on each sub-band. Obviously, the decision unit DEC has to be aware of the type of multiband signal it receives, the constellations that were used to modulate the different sub-bands of the multiband signal, and probably also of some other parameters such as the power level of the incoming multiband signal. This information may be obtained from the control unit CTRL. The sub-band symbols sy1, ..., syk, ..., syN at the outputs DEC-O1, ..., DEC-Ok, ..., DEC-ON of the decision unit DEC are serialised by the parallel to serial converter P/S so that the original data sequence is constituted.

The multiband receiver MB-R of FIG. 2 however contains a more advanced decision unit DEC which helps reducing intercarrier interference and intersymbol interference and so reduces the work to be done by the sub-band reconstruction and distortion compensation arrangement RDA. To realise this, the decision unit DEC is made a decision feedback unit which adds to the different sub-band signals si1, ..., sik, ..., siN at its input terminals DEC-I1, ..., DEC-Ik, ..., DEC-IN contributions from other sub-bands. These contributions to one sub-band signal sik are summed together by a single adder ADk at the corresponding input terminal DEC-Ik. The comparator means CMPk connected to this adder ADk performs the above described task of comparing the sub-band signal with a constellation scheme and determining therefrom the sub-band symbol syk, with as only difference that the sub-band signal used by the comparator means CMPk is made less affected by intercarrier and/or intersymbol interference. To a single sub-band signal sik, contributions from all other sub-bands may be added or contributions from only a few sub-bands, those which are most likely to affect this sub-band signal, may be added. Obviously, this has an impact on the complexity of the decision unit DEC. Moreover, to a single sub-carrier signal sik, contributions from one multiband symbol may be added or contributions of several multiband signals may be added. Evidently, this also has an impact on the complexity of the decision unit DEC. Each contribution of a sub-band to another sub-band may be generated by a topped delay line such as the one drown in FIG. 4. This tapped delay line TDk1 adds a contribution of the k'th sub-band to the first sub-band signal si1. The contribution is a weighted sum of three subsequent sub-band symbols syk. The three subsequent sub-band symbols syk belong to subsequent multiband symbols and are weighted by coefficients via the multipliers C1, C2 and C3 respectively. The delay units D1 and D2 perform a delay of one symbol period. The weights used by the multipliers C1, C2 and C3 are adapted in such a way that intercarrier interference and intersymbol interference are reduced optimally. The control unit CTRL of FIG. 2 thereto applies for instance an LMS (Least Mean Square) algorithm and adapts the weights via the control input Ck1.

An advantageous effect of the decision feedback structure of the decision unit DEC is that part of the job of the sub-band reconstruction and distortion compensation arrangement RDA is done with lower mathematical complexity. This is so since the decision unit DEC operates at symbol clock speed whereas the sub-band reconstruction and distortion compensation arrangement RDA operates at sample clock speed. The work of the sub-band reconstruction and distortion compensation arrangement RDA can only be done to a certain extent by the decision unit DEC since the operations at sample clock speed done by the arrangement RDA allow more accurate compensation of the distortion. Anyway, the more complexity is added to the decision unit DEC in the form of topped delay lines, the more the filters FIR1, ..., FIRk, ..., FIRN in the sub-band reconstruction and distortion compensation arrangement RDA can be reduced in length and thus also in complexity.

Figure 6:
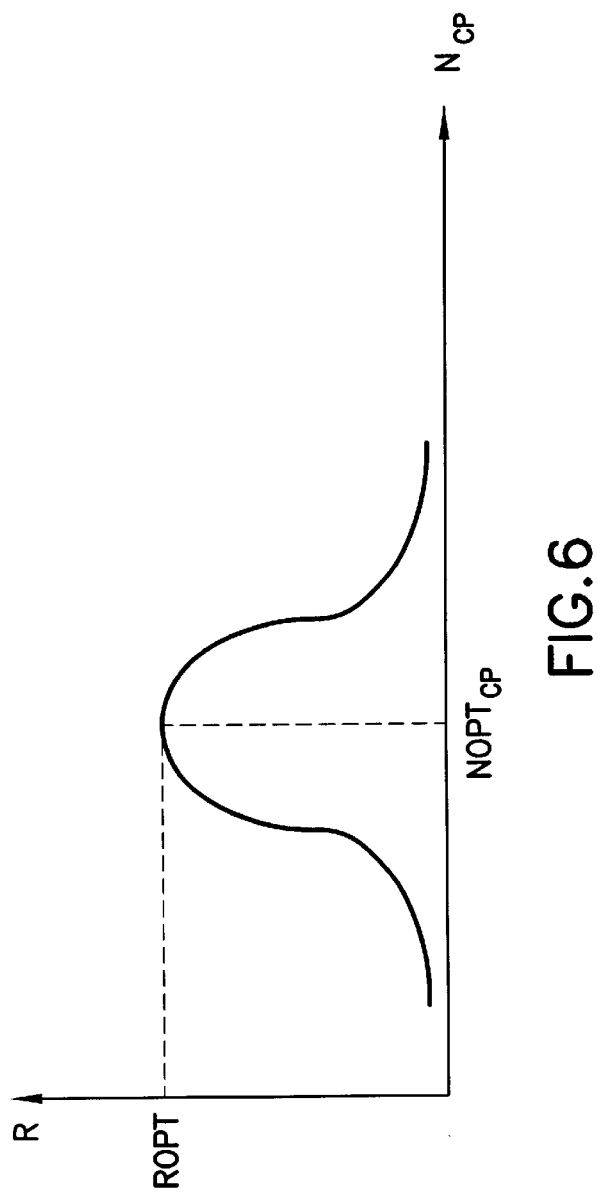
FIG. 6 is a graph illustrating the relation between the transfer rate R over a transmission line towards the multiband receiver MB-R and the length in samples $N_{CP}$ of a cyclic prefix added to multiband symbols transferred over this transmission line.

An advantageous effect of the present invention of the prior art multiband receiver MB-RX is that the cyclic prefix added to multiband symbols may be reduced because a better compensation for intercarrier interference and intersymbol interference is obtained. The effect of the cyclic prefix length $N_{CP}$ on the transfer rote R of data is illustrated by FIG. 6. The transfer rote R con mathematically be expressed as follows:

$$R = \varepsilon \cdot F_{SYMB} \cdot \sum_{i=1}^{N} b_i \quad (1)$$

Herein, $\varepsilon$ represents the efficiency, $F_{SYMB}$ represents the symbol rote, and $b_i$ is the number of data bits modulated on the i'th sub-band. The efficiency $\varepsilon$ depends on the length of the cyclic prefix $N_{CP}$ expressed as a number of samples, and can be written as follows:

$$\varepsilon = \frac{N_U}{N_U + N_{CP}} \quad (2)$$

Herein, $N_u$ is the number of useful samples, containing no redundant information, in a multiband symbol. If the cyclic prefix length $N_{CP}$ is reduced, the transfer rate R increases since the efficiency E increases. A reduced cyclic prefix $N_{CP}$ however has a decreasing effect on the signal to noise ratio because the remaining intersymbol/intercarrier interference is then higher, and thus also on the number of data bits $b_i$ modulated on the sub-bands. This disadvantageous effect of the decreasing cyclic prefix length $N_{CP}$ can be compensated for according to the present invention since a reduced intersymbol and intercarrier interference has an increasing effect on the signal to noise ratio within the different sub-bands and consequently also on the number of bits bi modulated on these sub-bands. As a result of the implementation of the present invention, the curve in FIG. 6 will move to the left compared to the prior art solution which implies that the optimal transfer rate ROPT can be achieved with a reduced cyclic prefix length $NOPT_{CP}$.

Figure 7:
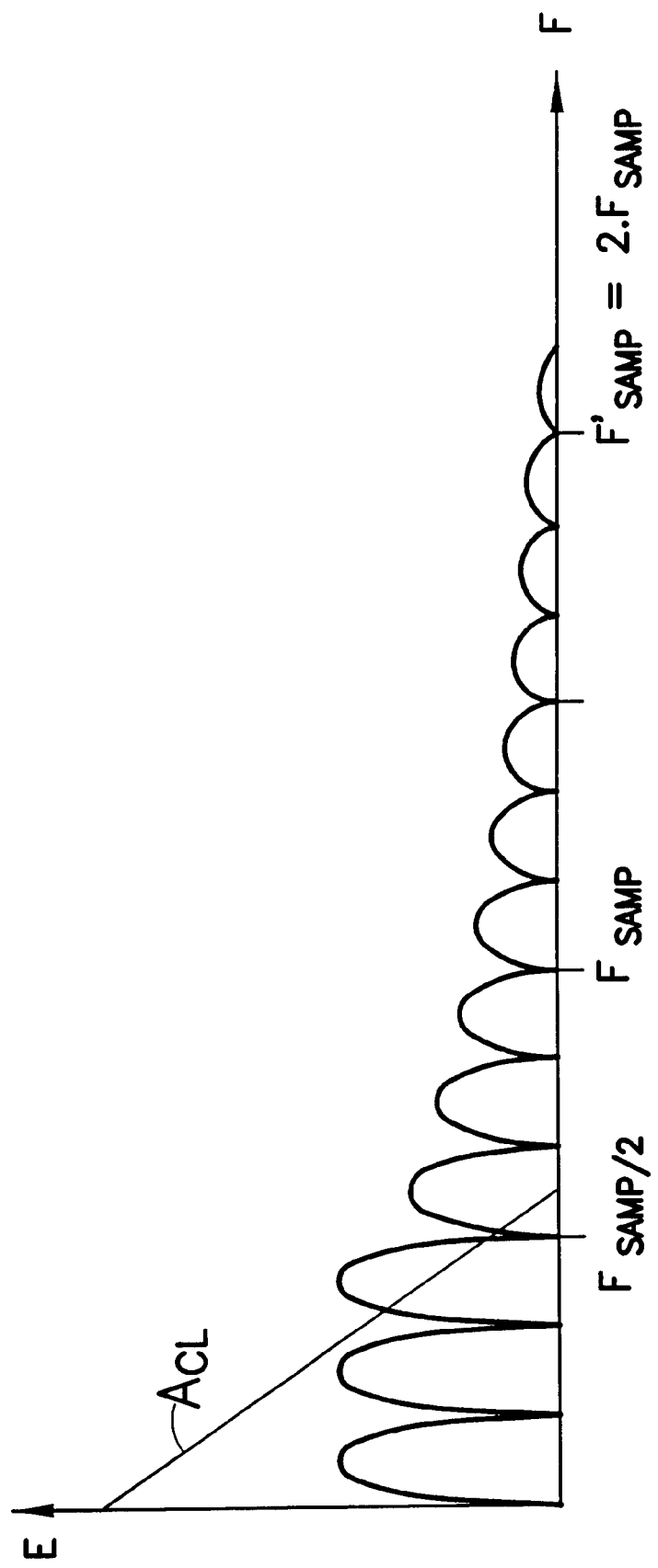
FIG. 7 is a graph illustrating the energy E in a multiband signal transferred over a transmission line as a function of frequency F, and the line attenuation $A_{CL}$ also as a function of frequency F.

A first remark is that the applicability of the present invention is not restricted by the transmission medium via which the multiband signal si is transported. In particular, any connection between a transmitting modem and receiving modem MB-R, e.g. a twisted pair telephone line, a cable connection, a satellite connection, a radio link through the air, and so on, may be affected by noise, and hence the detection process may be improved by using a multiband detector DET according to the present invention. Depending on the transmission medium, the performance of the multiband detector DET con be improved via fractionally spaced sampling. Fractionally spaced sampling implies sampling the incoming multiband signal at a higher sample clock speed than that of the multiband transmitter. An advantage thereof is that energy of the multiband signal which is located at a frequency higher than half the sample frequency of the multiband transmitter becomes available for sub-band reconstruction. Depending on the nature of the sub-bonds, i.e. the shape of the orthogonal base functions, the energy which is concentrated above half the sample frequency may be significant or not. FIG. 7 for instance illustrates a fictitious situation wherein a significant part of the energy E of a multiband signal is located at frequencies F above $F_{SAMP/2}$, $F_{SAMP}$ being the sample frequency of the multiband transmitter. The line marked $A_{CL}$ shows however that the attenuation of the transmission medium is very severe at frequencies above $F_{SAMP/2}$ from which it should be concluded that fractionally spaced sampling at a frequency $F'_{SAMP}=2 \cdot F_{SAMP}$ would not improve the detection process. Concluding, fractionally spaced sampling can be considered to improve the sub-band reconstruction process but only in multiband environments wherein the transmission medium is not strongly attenuating the energy that becomes available through fractionally spaced sampling.

The invention also is not only related to ADSL (Asymmetric Digital Subscriber Line) or similar systems wherein DMT (Discrete Multi Tone) modulation is used. A person skilled in the art will be able to adapt the above described embodiments so that it is applicable in any other system wherein a multi-band signal is transmitted from a transmitting modem to a receiving modem MB-R. Systems wherein orthogonal frequency division multiplexing (OFDM) or orthogonally multiplexed quadrature amplitude modulation (OMQAM) is applied for instance are multiband environments wherein the present invention is applicable. The number of sub-bands, the base functions used to define the sub-bands, and the fact whether different sub-bands can be modulated with a different amount of bits, with different constellations or not, is of no importance in view of the present invention.

Another remark is that embodiments of the present invention are described above in terms of functional blocks. From the functional description of these blocks, given above, it will be obvious for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention.

What is claimed is:

1. A multiband detector (DET) used to generate a plurality of sub-band symbols (sy1, . . . , syk, . . . , syN) from a distorted multiband signal (si) applied to a detector input thereof, said multiband detector (DET) comprising a cascade connection of:
   a. a sub-band reconstruction and distortion compensation arrangement (RDA) whose arrangement input (RDA-I) is coupled to said detector input and which is adapted to compensate for distortion in said distorted multiband signal (si) and to reconstruct a plurality of sub-band signals (si1, . . . , sik, . . . , siN) from said distorted multiband signal (si), and to source each sub-band signal (sik) amongst said plurality of sub-band signals (si1, . . . , sik, . . . , siN) via a respective arrangement output (RDA-Ok) amongst a plurality of arrangement outputs (RDA-O1, . . . , RDA-Ok, . . . , RDA-ON); and
   b. a decision unit (DEC) with a plurality of unit inputs (DEC-I1, . . . , DEC-Ik, . . . , DEC-IN) coupled one by one to said plurality of arrangement outputs (RDA-O1, . . . , RDA-Ok, . . . RDA-ON) and a plurality of associated unit outputs (DEC-O1, . . . , DEC-Ok, . . . , DEC-ON), said decision unit (DEC) including between each unit input (DEC-Ik) and associated unit output (DEC-Ok) a comparator means (CMPk) adapted to compare said sub-band signal (sik) with a constellation scheme and to thereupon decide upon the value of a sub-band symbol (syk) amongst said plurality of sub-band symbols (sy1, . . . , syk, . . . , syN),
   CHARACTERISED IN THAT said sub-band reconstruction and distortion compensation arrangement (RDA) contains between said arrangement input (RDA-1) and each arrangement output (RDA-Ok), a single digital filter (FIRk) whose taps are set to perform sub-band reconstruction and distortion compensation simultaneously and to thereby generate a said sub-band signal (sik).

2. A multiband detector (DET) according to claim 1, CHARACTERISED IN THAT said multiband detector (DET) further comprises:
   c. a control unit (CTRL) adapted to modify said taps of said digital filter (FIRk) upon changes in distortion of said distorted multiband signal (si).

3. A multiband detector (DEC) according to claim 2, CHARACTERISED IN THAT said control unit (CTRL) further is adapted to modify the amount of said taps of said digital filter (FIRk).

4. A multiband detector (DET) according to claim 1, CHARACTERISED IN THAT said comparator means (CMPk) is coupled to at least one tapped delay line (TDk1) adapted to feed back a linear combination of subsequent sub-band symbols (syk) at said corresponding unit output (DEC-Ok) to another unit input (DEC-I1) than said unit input (DEC-Ik) to be added there to a sub-band signal (si1) received from said sub-band reconstruction and distortion compensation arrangement (RDA).

5. A multiband detector (DET) according to claim 4, CHARACTERISED IN THAT said control unit (CTRL) further is adapted to modify coefficients in said linear combination of subsequent sub-band symbols (syk).

6. A multiband detector (DET) according to claim 1, CHARACTERISED IN THAT a sample clock of said multiband detector (DET) has a higher sample clock speed than a sample clock of a multiband transmitter which generated said multiband signal (si).

7. A multiband detector (DET) according to claim 2, CHARACTERISED IN THAT:

said comparator means (CMPk) is coupled to at least one tapped delay line (TDk1) adapted to feed back a linear combination of subsequent sub-band symbols (syk) at said corresponding unit output (DEC-Ok) to another unit input (DEC-I1) than said unit input (DEC-Ik) to be added there to a sub-band signal (si1) received from said sub-band reconstruction and distortion compensation arrangement (RDA); and said control unit (CTRL) further is adapted to modify coefficients in said linear combination.

* * * * *